United States Patent
Covert et al.

(10) Patent No.: US 10,556,505 B2
(45) Date of Patent: Feb. 11, 2020

(54) METHODS AND SYSTEMS FOR A FUEL SYSTEM

(71) Applicant: Ford Global Technologies, LLC, Dearborn, MI (US)

(72) Inventors: Tim Covert, Southfield, MI (US); Frank Joseph Topolovec, Canton, MI (US); John Alva Kinzinger, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 15/003,648

(22) Filed: Jan. 21, 2016

(65) Prior Publication Data

US 2017/0210222 A1    Jul. 27, 2017

(51) Int. Cl.
*B60K 15/04* (2006.01)

(52) U.S. Cl.
CPC ...... *B60K 15/0403* (2013.01); *B60K 15/0406* (2013.01); *B60K 2015/047* (2013.01)

(58) Field of Classification Search
CPC .......... B60K 15/0403; B60K 15/0458
See application file for complete search history.

(56) References Cited

U.S. PATENT DOCUMENTS

| | | | |
|---|---|---|---|
| 4,002,778 A * | 1/1977 | Bellis | C23C 18/34 427/265 |
| 4,707,722 A * | 11/1987 | Folk | C23C 18/06 257/699 |
| 5,312,545 A | 5/1994 | Starin et al. | |
| 5,803,131 A | 9/1998 | Iwasa et al. | |
| 6,802,430 B2 | 10/2004 | Tomimura et al. | |
| 2006/0035101 A1* | 2/2006 | Yuan | C23C 18/168 428/615 |
| 2008/0156800 A1 | 7/2008 | Mougenot | |
| 2008/0283124 A1 | 11/2008 | Hatchett et al. | |
| 2010/0224260 A1* | 9/2010 | Avakian | B60K 15/0403 137/13 |
| 2013/0327435 A1* | 12/2013 | Kaneta | F16L 58/08 138/145 |
| 2015/0044374 A1 | 2/2015 | Janik et al. | |

FOREIGN PATENT DOCUMENTS

JP          09156385 A    *  6/1997

OTHER PUBLICATIONS

ASTM B733-04 (Reapproved 2009), "Standard Specification for Autocatalytic (Electroless) Nickel-Phosphorus Coatings on Metal," ASTM International, pp. 3, 2009, 14 pages.

* cited by examiner

*Primary Examiner* — Dah-Wei D. Yuan
*Assistant Examiner* — Nga Leung V Law
(74) *Attorney, Agent, or Firm* — Geoffrey Brumbaugh; McCoy Russell LLP (57) ABSTRACT

Methods and systems are provided for a fuel system including a fuel filler pipe, an anti-siphoning device, and a fuel tank. In one example, a manufacturing method may include internally welding an anti-siphon device to a fuel filler pipe, applying a metal coating to the welded device and pipe including the internal welds, and externally welding the coated pipe including the device to a fuel tank. The metal coating to the filler pipe, the device and the internal welds may be applied by an electroless plating process but the electroless plating may not be applied to the external welds.

13 Claims, 10 Drawing Sheets

METHODS AND SYSTEMS FOR A FUEL SYSTEM

FIELD

The present description relates generally to methods and systems for fuel system utilized with a vehicle system and including a fuel tank, a fuel filler tube and an anti-siphoning device.

BACKGROUND/SUMMARY

Majority of the vehicle systems are configured to operate with a wide variety of fuels, including fuels with a range of alcohol concentrations, such as various gasoline-ethanol blends, including E10, E85, etc. Thus, components of fuel systems, including fuel filler pipes (also known as fuel inlet pipes), which are utilized for transferring fuel from an external source to the fuel tanks, and the fuel tanks, are subjected to corrosive effects of ethanol and acids in the fuel. In addition to corrosion by fuel, the fuel system components may be exposed to environmental corrosion conditions, such as humidity, salt, etc., on the exterior. Corrosion leads to rust formation and mechanical degradation of the fuel system components.

Further, fuel systems include anti-siphoning devices, which are utilized for preventing theft of fuel from the tanks via the fuel filler pipes. The anti-siphoning devices are coupled to the fuel filler pipe. Thus, fuel and external environmental factors mentioned above also corrode the anti-siphoning device. Further, the corrosion not only causes mechanical degradation of the anti-siphon device, the coupling between the fuel filler pipe and the anti-siphon device is weakened. Further, corrosion that may develop within the tank may clog fuel injectors and fuel filters. Still further, some vehicle systems (e.g., trucks) utilize a metal fuel filler cap that is threaded onto the fuel filler pipe. The fuel and the external environmental factors may also induce galvanic corrosion between the metals of the fuel filler pipe and the cap.

The inventors herein have recognized the above-mentioned issues. In one example, the issues described above may be addressed by a manufacturing method for a fuel tank and a fuel filler pipe, comprising: coupling a device to the fuel filler pipe with one or more first welding joints, then coating the coupled fuel filler pipe and device with a first coating; and then, coupling the coated fuel filler pipe including the device to the fuel tank with one or more second welding joints. In this way, corrosion protection is provided by coating the fuel filler pipe, the device, and the coupling between the pipe and the device.

As an example, a device, such as an anti-siphoning device, is welded internally to a fuel filler pipe. After welding, the fuel filler pipe and the anti-siphoning device assembly, including the internal welds are coated for corrosion protection. After coating, the assembly is welded externally to the fuel tank. By coating the fuel filler pipe and the device assembly including the fuel filler pipe, the device, and the welds coupling the fuel filler pipe and the device, corrosion of the pipe, the device and the coupling is reduced, thereby reducing mechanical degradation.

In another example, a manufacturing method for a fuel tank and a fuel filler pipe comprises welding an anti-siphon device to an interior of the fuel filler pipe, then coating the welded fuel filler pipe and the device with an electroless nickel coating; and then welding the coated fuel filler pipe and the device to the fuel tank. The electroless nickel coating is applied to the internal and the external surfaces of the fuel filler pipe including external threads on the fuel filler pipe that are utilized for receiving a metal fuel filler cap, the anti-siphon device, and the welds between the fuel filler pipe and the device.

By utilizing the electroless nickel plating process, nickel coating of substantially constant thickness may be achieved on all coated surfaces. In particular, the fuel filler pipe and/or the device may include surfaces that form complex geometric and/or non-geometric structures such as sharp edges, holes, ridges, tabs, deep recesses, protrusions, conical structures, cylindrical structures, spindle-shaped structures, slots, seams, threads, etc. By utilizing electroless nickel plating, uniform coating on all surfaces may be achieved. As a result, in addition to uniform corrosion protection for all coated surfaces, visual appearance of the pipe and the device assembly is improved.

Further, by utilizing electroless nickel plating on the exterior threads of the fuel filler pipe, galvanic corrosion between the metals of the fuel filler pipe and the cap is reduced. Still further, a desired thickness of the coating that reduces interference with threading of the metal cap onto the filler tube may be achieved by the electroless nickel plating process.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
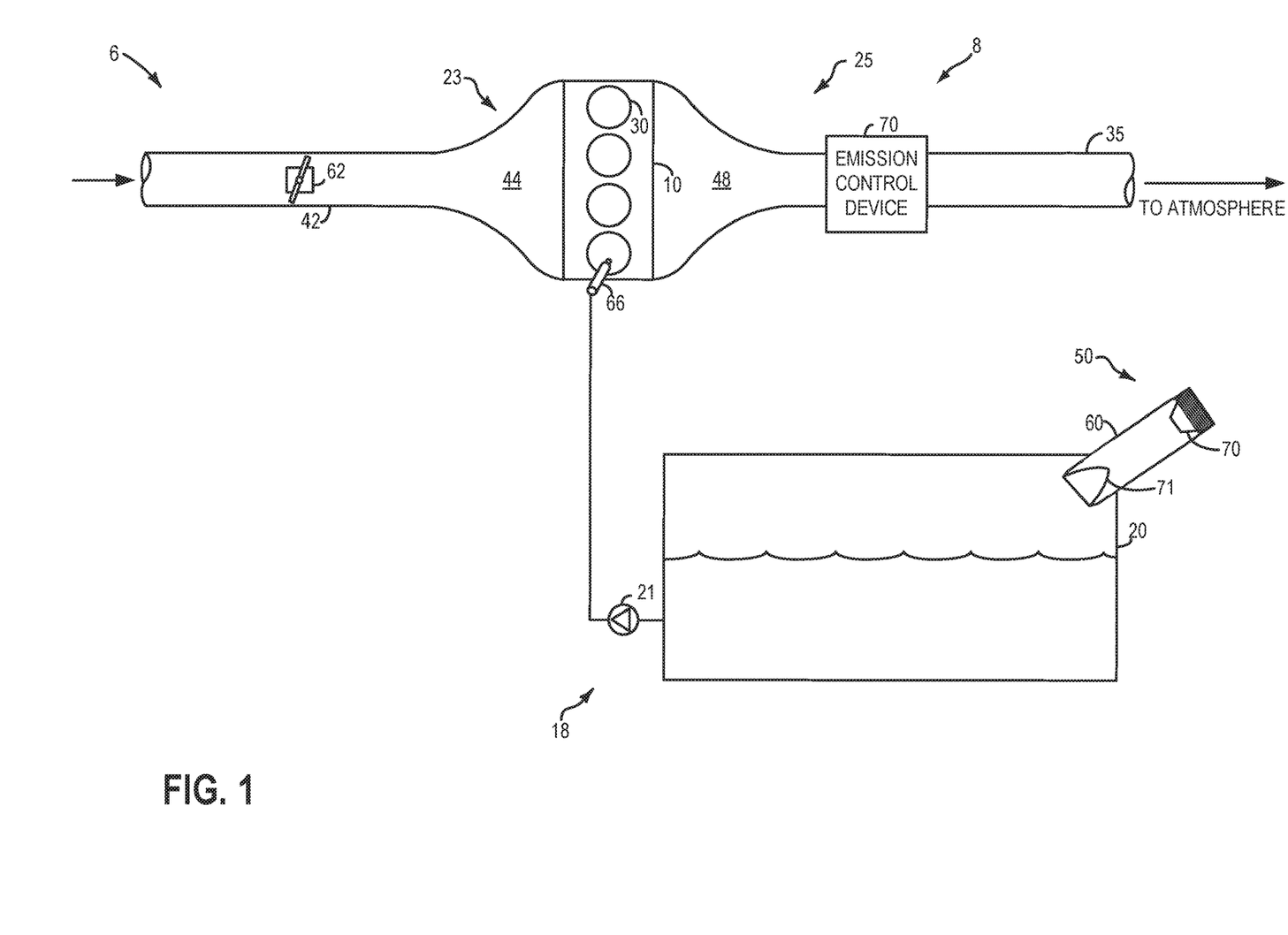
FIG. 1 is a schematic depiction of a vehicle system including an engine system and a fuel system.

The following description relates to methods and systems for a fuel system, such as the fuel system of FIG. 1, which may be utilized within a vehicle system, such as the vehicle system of FIG. 1. As shown in FIG. 1, the fuel system may include a fuel tank, and a fuel filler pipe. The fuel filler pipe may include a first insert, which may be a nozzle guide for a fuel dispensing nozzle; and a second insert, which may be an anti-siphoning device. The fuel filler pipe and the first insert may be coupled by one or more welding joints. Likewise, the fuel filler pipe and the second insert may be coupled by one or more welding joints. The coupled fuel filler pipe and inserts (alternatively referred to herein as the pipe and insert assembly, or the pipe and device assembly, or fuel filler pipe and insert assembly, or fuel filler pipe and device assembly) may then be coated with a nickel coating. The nickel coated pipe and insert assembly may be subsequently coupled to the fuel tank by one or more welding joints. Details of coupling and coating of the pipe and insert assembly, and the coupling between the fuel tank and the fuel filler pipe are illustrated in FIGS. 2A-2C, and 3A-3E. The nickel coating may be applied by an electroless nickel coating process to achieve a substantially constant thickness on the inside and the outside surfaces of the fuel filler pipe including the surfaces of the device and the couplings between the filler and the insert. Further, electroless nickel provides nearly uniform coating of substantially constant thickness on all surfaces that form complex geometric and non-geometric shapes. An example fuel filler pipe and insert assembly including complex structures is illustrated in FIGS. 4A-4C. Details of a manufacturing process for coupling the fuel filler pipe with the insert, coating the pipe and insert assembly, and subsequently coupling the coated assembly to the fuel tank is described at FIG. 5.

Referring now to FIG. 1, a schematic depiction of a vehicle system 6 is shown. The vehicle system 6 may be used in any vehicle, such as a car, truck, van, sports utility vehicle, recreational vehicle, etc. The vehicle system 6 includes an engine system 8 coupled to a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system.

Fuel tank 20 may hold a plurality of fuel blends, including fuel with a range of alcohol concentrations, such as various gasoline-ethanol blends, including E10, E85, gasoline, etc., and combinations thereof. In one example, the fuel tank may be made of metal, such as aluminized steel.

Fuel tank 20 may be coupled to a fuel filler system 50. The fuel filler system 50 may include a fuel filler pipe 60 coupled to a first device 70 and a second device 71. As shown, the fuel filler pipe 60 is in fluidic communication with the fuel tank 20. The first device 70 may be a nozzle guide for a fuel dispenser, for example. The second device 71 may be an anti-siphoning device for preventing siphoning of the fuel from the tank via the fuel filler pipe. In one example, as shown in FIG. 1, the first device 70 is positioned within an upper portion of the fuel filler pipe that is not coupled to the fuel tank. The second device 71 is positioned within a lower portion of the fuel filler pipe. While the present example shows the first device and the second device coupled within the fuel filler pipe, it will be appreciated that embodiments wherein the fuel filler pipe includes one of the two devices, such as the first device or the second device, are possible.

Further, it will be appreciated that in examples where the fuel filler pipe includes only the first device 70 (and not the second device 71), the first device 70 may be alternatively positioned within a lower portion of the fuel filler pipe or within a middle portion of the fuel filler pipe 60. Similarly, in examples where the fuel filler pipe includes the second device 71 and not the first device 70, the second device 71 may be positioned within an upper portion of the fuel filler pipe or within the middle portion of the fuel filler pipe 60. Further, in one example, the first device 70 and/or the second device 71 may be at least partially positioned within the fuel filler pipe 60. In another example, the first device 70 and/or the second device 71 may be fully positioned within the fuel filler pipe.

The fuel filler pipe 60 may comprise a threaded upper portion for receiving a fuel filler cap (not shown). The threads may be on the external surface of the upper portion of the fuel filler pipe, for example. In other examples, the threads for receiving the fuel filler cap may be on the internal surface of the upper portion of the fuel filler pipe. Further, the fuel filler cap may be made of metal, such as brass. In addition to the (external) threaded upper portion, the fuel filler pipe 60 may include one or more surfaces that form simple and/or complex geometrical and/or non-geometrical structures such as sharp edges, holes, ridges, tabs, deep recesses, protrusions, conical structures, cylindrical structures, spindle shaped structures, helical structures, slots, seams etc. An example of a fuel filler pipe including plurality of structures is shown is shown at least at FIG. 4A. Further, it will be appreciated that the structures may provide one or more function. For example, the fuel filler pipe may include a plurality of holes and plurality of slots for allowing fuel to flow into the tank. Similarly, the first device 70 and the second device 71 may include a plurality of surfaces that form simple and/or complex geometrical and/or non-geometrical structures as mentioned above including threads. For example, the insert 70 may include a conical structure for diverting fuel into the tank without splashing.

In one embodiment, the fuel filler pipe 60 may be coupled to the device 70 by one or more welding joints. Specifically, the device 70 may be internally welded at one or more portions along an internal perimeter of the fuel filler pipe 60. Further, the fuel filler pipe 60 may be coupled to the second device 71 by one or more welding joints. After the first device 70 and the second device 71 are welded to the fuel filler pipe 60, the fuel filler pipe and the device assembly may be coated on interior and exterior surfaces by an electroless nickel plating process. The interior and exterior surfaces may include the surfaces of the first and second devices, the welding joints coupling each of the devices 70 and 71 with the fuel filler pipe, and the external threads. The electroless nickel plating process is used to deposit a coating of nickel or nickel-alloy (e.g., Nickel phosphorous alloy) of desired thickness that is substantially constant on all coated surfaces. The coated fuel filler pipe and device assembly may be subsequently welded to the fuel tank 20. The welding joints between the fuel filler pipe and the fuel tank are formed after coating the fuel filler pipe and device assembly by the electroless nickel plating process. Thus, the welding joints between the fuel filler pipe and the tank are not coated by electroless nickel plating process. Further, it must be noted that the electroless nickel plating does not reduce the weldability of the fuel filler pipe to the fuel tank. An example fuel system including welding joints between a fuel tank and a fuel filler pipe, and welding joints between the fuel filler pipe and the first device, and between the fuel filler pipe and the second device are further elaborated at FIG. 2A. Details of the welding joints and the coating are further illustrated at FIGS. 2B and 2C.

Figure 2A:
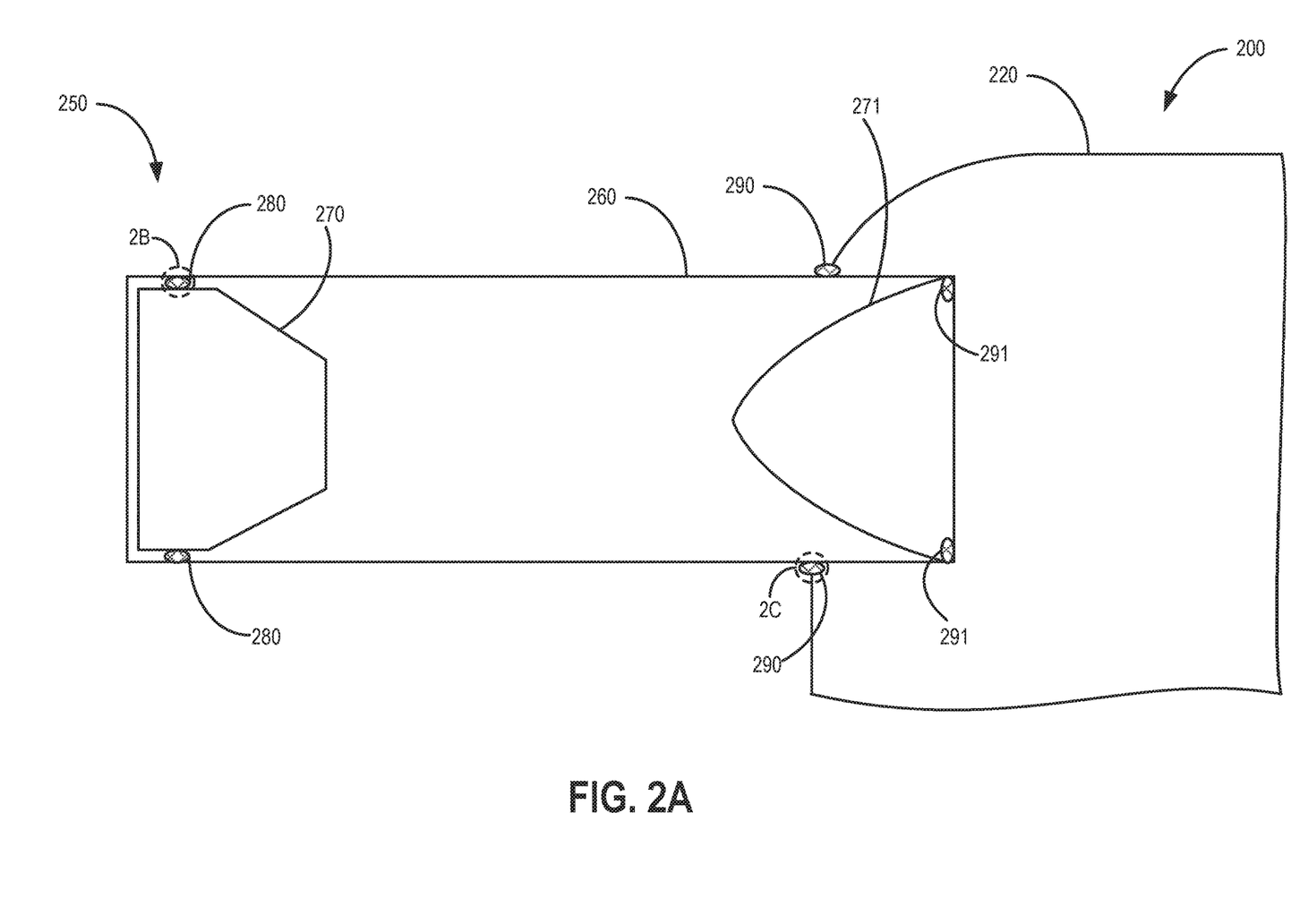
FIG. 2A is a schematic depiction of a portion of an example fuel system including a fuel filler pipe, a first device, a second device, and a portion of a fuel tank. The fuel system may be included in the vehicle system of FIG. 1.

Turning now to FIG. 2A, an example fuel system 200 including a fuel tank coupled to a fuel filler pipe and device assembly is shown schematically. As such, fuel system 200 may be coupled to the vehicle system 6 of FIG. 1. In one example, fuel system 200 may be the same as fuel system 18 at FIG. 1.

Fuel system 200 includes a fuel filler pipe and device assembly 250 and a fuel tank 220. The fuel filler pipe and device assembly 250 includes a fuel filler pipe 260, a first device 270, and a second device 271. The first device may be a nozzle guide for receiving a nozzle of a fuel dispensing device. The second device may be an anti-siphoning device for preventing theft of fuel from the fuel tank via the fuel filler pipe. In some examples, the assembly 250 may be inserted within a larger fuel filler pipe that may be coupled to the fuel tank.

Figure 2B:
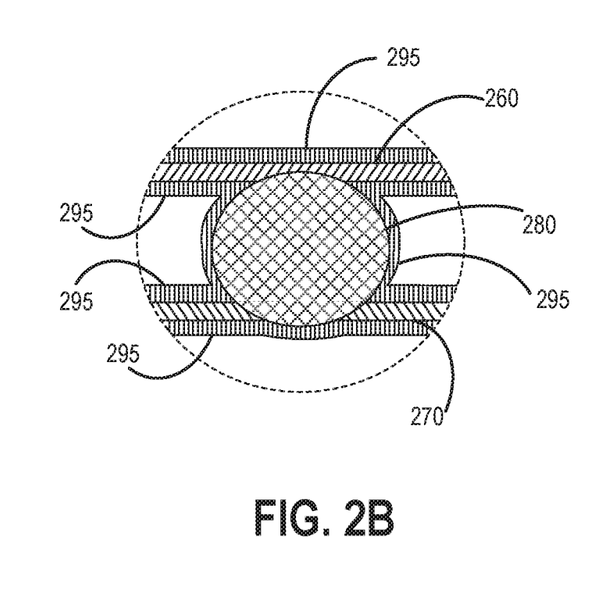
FIG. 2B shows a partial cross-sectional view of a welding joint coupling the fuel filler pipe and the first device of FIG. 2A.

The fuel filler pipe and device assembly 250 further includes one or more welding joints 280 coupling the fuel filler pipe 260 and the first device 270. The first device 270 may be positioned within the fuel filler pipe 260, and internally welded to the fuel filler pipe 260. Thus, the welding joints 280 are formed by welding the fuel filler pipe 260 and the first device 270. The fuel filler pipe and device assembly 250 further includes one or more welding joints 291 coupling the fuel filler pipe 260 and the second device 271. After welding the first device 270 and the second device 271 to the fuel filler pipe 260, the filler pipe and device assembly 250 is coated by an electroless nickel coating process in order to coat the welded fuel filler pipe and anti-siphon device assembly internally and externally. The electroless nickel coating process deposits a coating of nickel of desired thickness on the inside and the outside surfaces of the fuel filler pipe including all the surfaces of the anti-siphon device, the first welding joints 280 and the second welding joints 291. Further, the electroless nickel coating process coats the surface areas of the fuel filler pipe and the devices that form simple and/or complex geometrical and/or non-geometrical structures as mentioned at FIG. 1. Thus, the fuel filler pipe 260, the first device 270, the second device 271, the first welding joints 280, and the second welding joints 291 are coated with electroless nickel, and the coating is uniform. Details of the welding joint 280 between the fuel filler pipe and the first device including the electroless coating is shown in FIG. 2B. An example of a welding joint between the filler pipe and the second device including the electroless coating will be elaborated with respect to FIG. 3D.

Turning to FIG. 2B, a partial cross-sectional view of the welding joint 280 coupling the fuel filler pipe 260 and the first device 270 is shown.

FIG. 2B further shows an electroless nickel coating layer 295 applied to the fuel filler pipe 260 and the first device 270. As shown, electroless nickel coating is applied on the inside and the outside of the fuel filler pipe 260, on the surfaces of the first device 270 facing the internal surface of the fuel filler pipe, on the inside surfaces of the first device (opposite to the surface facing the fuel filler pipe), and surrounding the weld 280. Further, a thickness of the coating is substantially constant on coated surfaces of the fuel filler pipe 260 and the first device 270, and surrounding the weld 280.

Returning to FIG. 2A, after coating the assembly 250, the assembly 250 is welded to the fuel tank 220. Thus, assembly 250 and fuel tank 220 are coupled by one or more welding joints 290. The welding joints 290 may be formed between an external surface of the fuel filler pipe 260 and the fuel tank 220. Further, the welding joints 290 between the assembly 250 and the fuel tank 220 are formed after coating the assembly, and therefore, the welding joints 290 are not coated by the electroless nickel coating process. Details of the welding joint 290 between the fuel tank and the assembly 250 is shown at FIG. 2C.

Figure 2C:
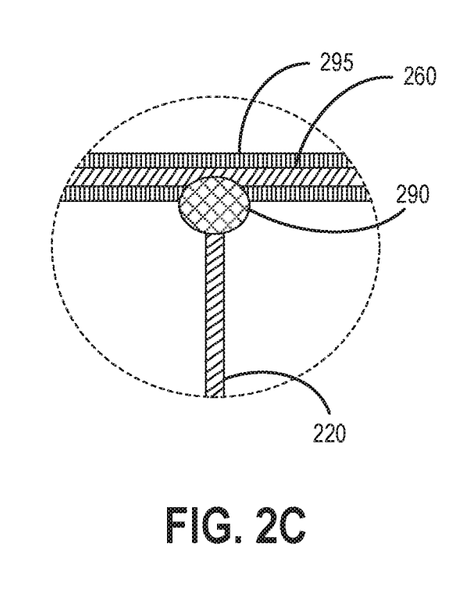
FIG. 2C shows a partial cross-sectional view of a welding joint coupling the fuel filler pipe and the portion of the fuel tank of FIG. 2A.

Turning to FIG. 2C, a partial cross-sectional view of the welding joint 290 coupling the fuel filler pipe 260 and the fuel tank 220 is shown. As described above, the welding joint 290 is formed after the fuel filler pipe and device assembly 250 is coated with electroless nickel. Thus, the second welding joint is not coated with electroless nickel coating 295. In this example, the fuel tank is shown without coating. However, it will be appreciated that electroless nickel coating or any other suitable coating may be applied to the fuel tank prior to welding the coated assembly to the tank.

It must be noted that the electroless nickel coating on the assembly 250 provides weldability of the coated assembly to the fuel tank. Said another way, electroless nickel coating does not reduce the weldability of the assembly to the tank. Further, after attaching the assembly to the fuel tank, the external surface of the coated assembly and the tank may be powder-coated.

In this way, by first welding the first and the second devices to the fuel filler pipe, and subsequently coating the welded fuel filler pipe and device assembly, the welding joints between the fuel filler pipe and the first insert, and the welding joints between the fuel filler pipe and the second device are coated. As a result, welds between the filler pipe and the devices are protected by coating, and corrosion of the welds is reduced. Further, by using an electroless coating process to coat the welded assembly, uniform coating is provided on the internal surfaces and the external surfaces of the fuel filler pipe and the devices, and around the weld, which improves visual appearance of the assembly, thereby providing good aesthetics to a user/customer. Still further, a desired thickness of coating that provides reduced interference to threading of a metal cap to the fuel filler may be achieved by electroless nickel coating process.

Figure 3A:
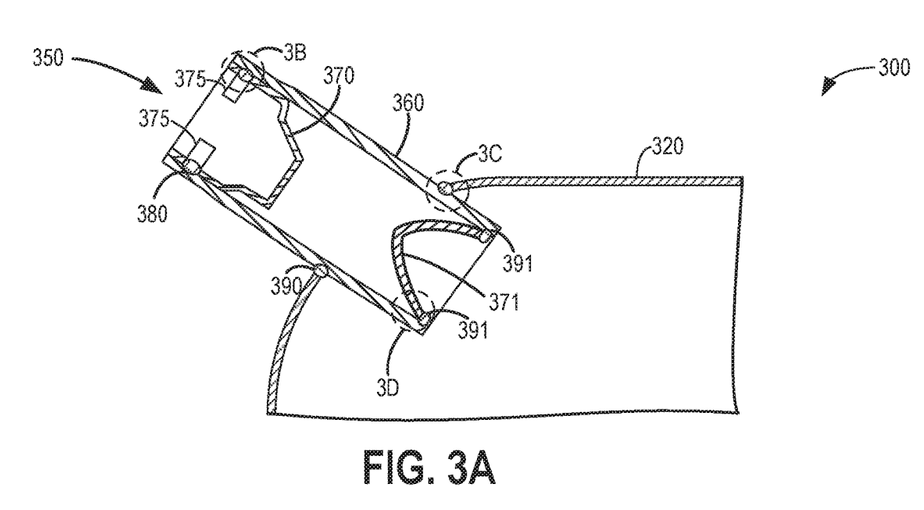
FIG. 3A is a schematic depiction of a portion of another example fuel system including a fuel filler pipe, a first device, a second device, and a portion of a fuel tank. The fuel system may be included in the vehicle system of FIG. 1.
Figure 4A:
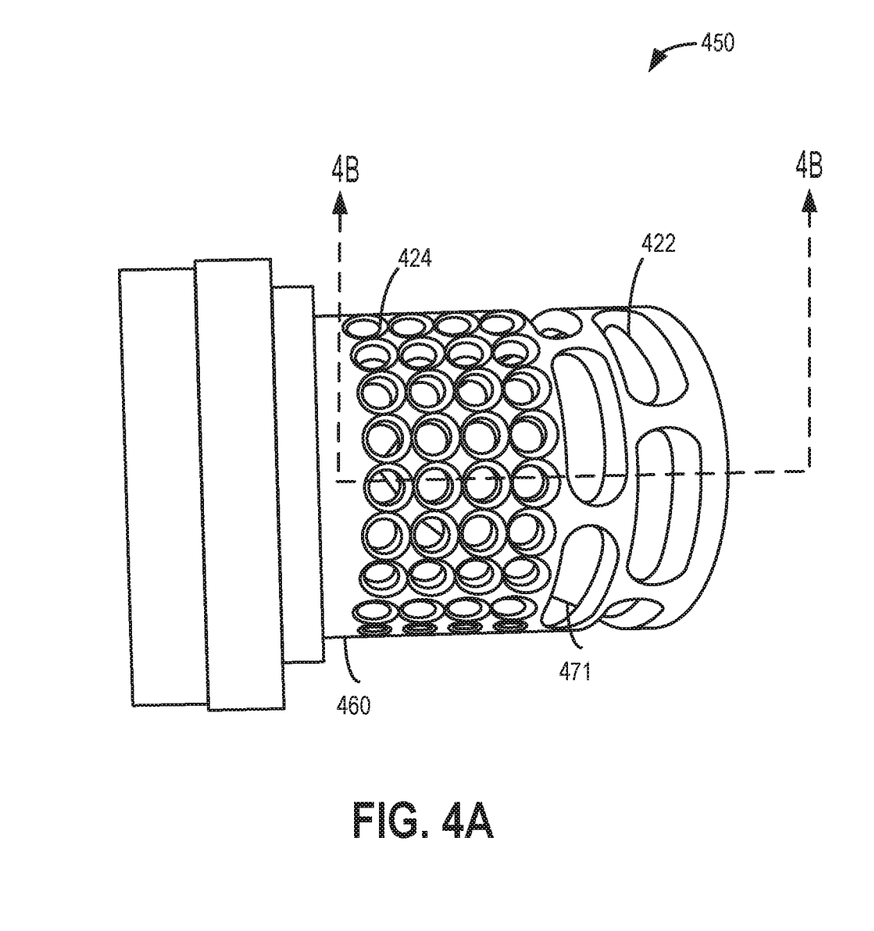
FIG. 4A is a side view of an example fuel filler pipe including an anti-siphon device.
Figure 4B:
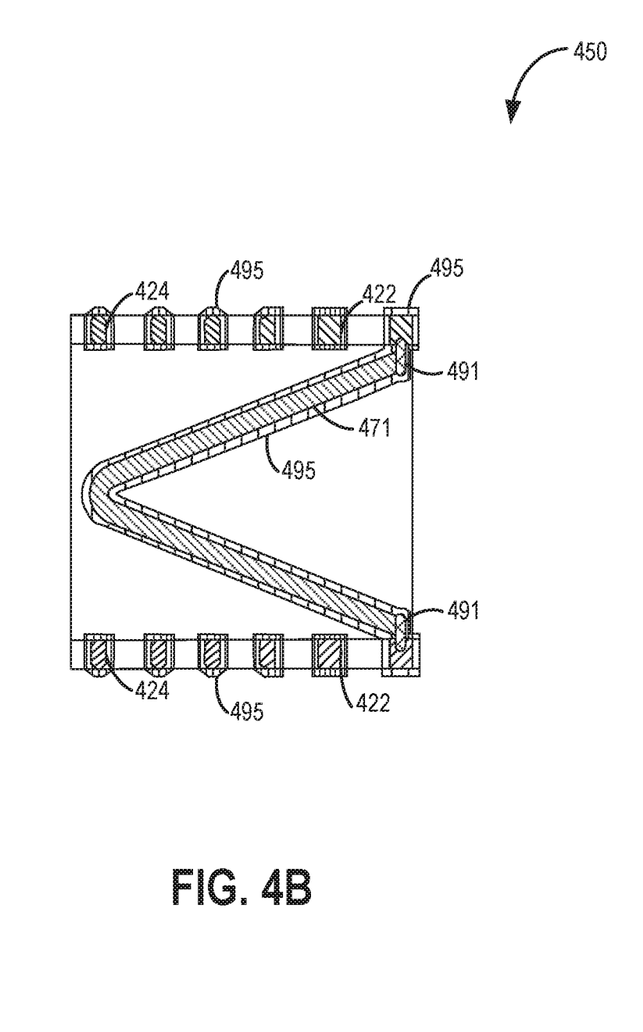
FIG. 4B is a cross-sectional view of a portion of the fuel filler pipe of FIG. 4A.
Figure 4C:
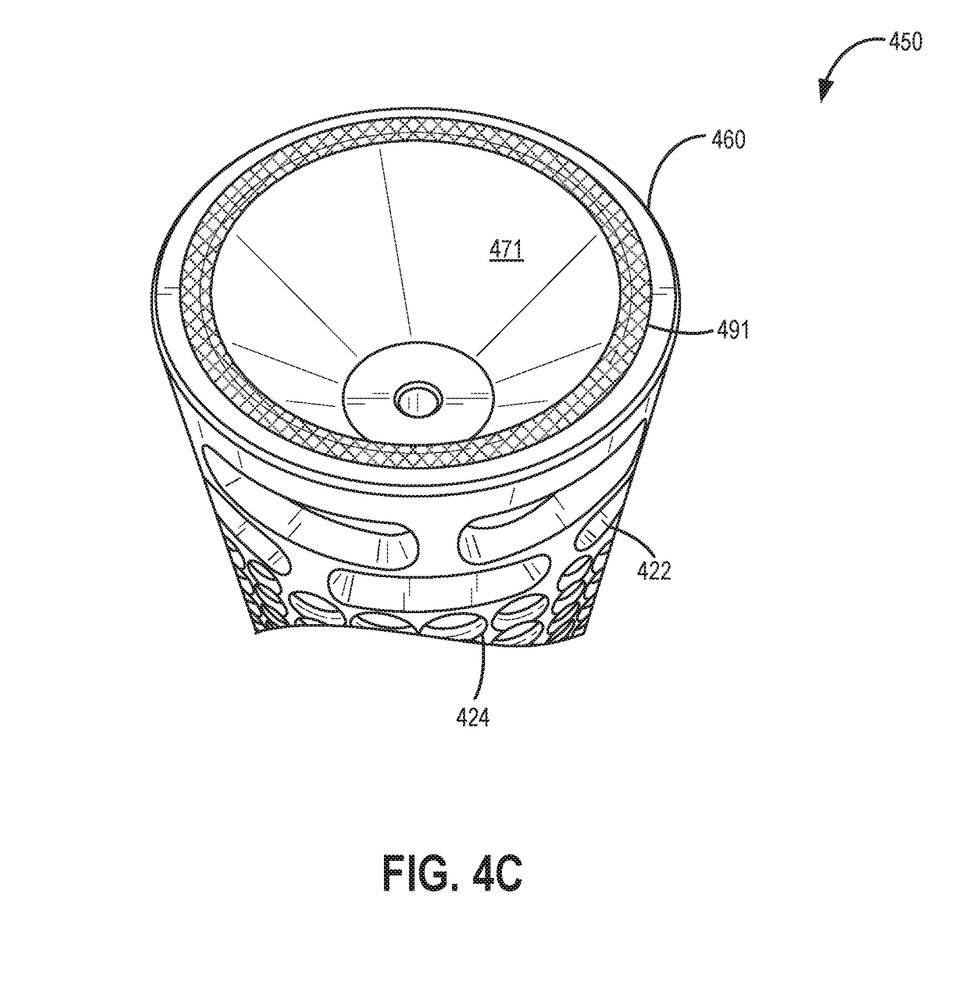
FIG. 4C is a partial bottom perspective view of the fuel filler pipe of FIG. 4A showing a welding joint between the fuel filler pipe and the anti-siphon device.

FIG. 3A shows a schematic illustration of another exemplary fuel system 300 comprising a fuel filler pipe and device assembly 350 and a fuel tank 320, which may be included in vehicle system 6 of FIG. 1. In one example, fuel system 300 may be the same as fuel system 18 at FIG. 1.

The fuel filler pipe and device assembly 350 may comprise a fuel filler pipe 360 coupled to a first device 370 by one or more welding joints 380. The first device 370 may be similar to first device 270 at FIG. 2. Thus, first device 370 may be a nozzle guide. The first device 370 may include one or more slots 375 for welding the first device 370 to the fuel filler pipe 360. Specifically, the first device 370 may be positioned within the fuel filler pipe 360. The first device 370 may be internally welded via slots 375 to the fuel filler pipe 360. While the present example shows the first device completely positioned within the fuel filler pipe, in some examples, the anti-first device may be partially positioned within the fuel filler pipe.

The fuel filler pipe and device assembly 350 further includes one or more welding joints 391 coupling a second device 371 to the fuel filler pipe 360. The second device may be an anti-siphoning device and may be conical or dome shaped with an apex facing into the tubular body of the fuel filler pipe 260. As shown, the second device 371 may be positioned within a lower portion of the fuel filler pipe 360, while the first device 370 is positioned within an upper portion of the fuel filler pipe. The second device may be welded to an inner surface of the fuel filler pipe. Thus, the second device 371 may also be internally welded to the fuel filler pipe 360. Specifically, a base of the second device that is opposite to the apex may be welded circumferentially to the inner surface of the fuel filler pipe 360 as shown in a bottom view of the fuel filler pipe and device assembly in FIG. 3E. As shown in FIG. 3E, welding joint 391 may be a single continuous weld coupling the second device 371 and the fuel filler pipe. Alternatively, a plurality of welds between an inner circumferential surface of the fuel filler pipe 360 and an outer surface the base of the second device 371 may be utilized to couple the second device 371 to the pipe 360.

The fuel filler pipe and device assembly 350 further comprises an electroless nickel coating. The electroless nickel coating may be formed after the first and the second devices are welded to the fuel filler pipe 360. Thus, the welding joints 380 and the welding joints 391 are coated with electroless nickel coating as shown in the partial cross-section at FIG. 3B and FIG. 3D respectively. After coating the assembly 350, the coated assembly is coupled to the fuel tank 320 by one or more welding joints 390. Thus, the welding joints 390 are not coated with electroless nickel coating as shown in the partial cross-section at FIG. 3C.

Figure 3B:
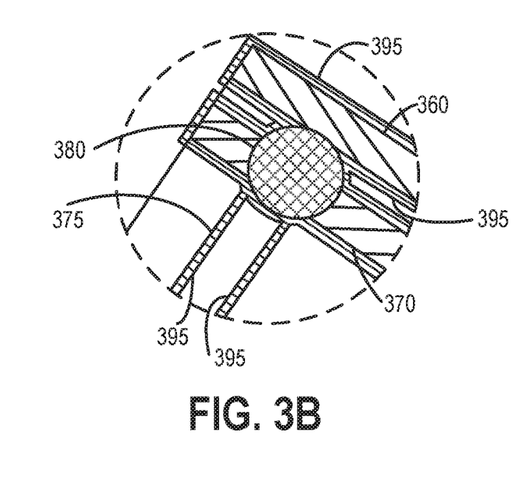
FIG. 3B shows a partial cross-sectional view of a welding joint coupling the fuel filler pipe and the first device of FIG. 3A.
Figure 3C:
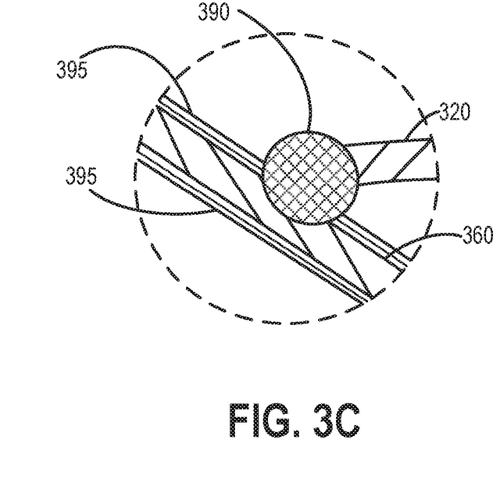
FIG. 3C shows a partial cross-sectional view of a welding joint coupling the fuel filler pipe and the portion of the fuel tank of FIG. 3A.

Turning to FIG. 3B, a partial cross-sectional view of the welding joint 380 coupling the fuel filler pipe 360 and the first device 370 is shown.

FIG. 3B shows electroless nickel coating layer 395 applied to the fuel filler pipe 360 and the first device 370. The electroless nickel coating 395 coats both the inside and the outside surfaces of the fuel filler pipe 360, and coats the inside and the outside surfaces (that is, the surface facing the fuel filler pipe surface) of the first device 370. Further, since the electroless nickel coating is applied after the first welding joints are formed, the electroless nickel coating 395 covers the first welding joint 380. As indicated, the coating 395 forms a continuous layer along the internal surface of the first device 370 and the first welding joint 380. Further, the coating 395 forms a continuous layer along a surface opposite to the internal surface of the first device and facing an internal surface of the fuel filler pipe, the first welding joint 380, and the internal surface of the fuel filler pipe 360.

Further, electroless nickel coating coats the internal and external surfaces of any structures within the assembly 350. For example, electroless nickel coating 395 coats the surfaces that form the slots 375 within the first device 370.

Further, a thickness of the coating is substantially constant on all the surfaces, including the inside and the outside of the fuel filler pipe 360 and the first device 370, and surrounding the first welding joint 380.

Figure 3D:
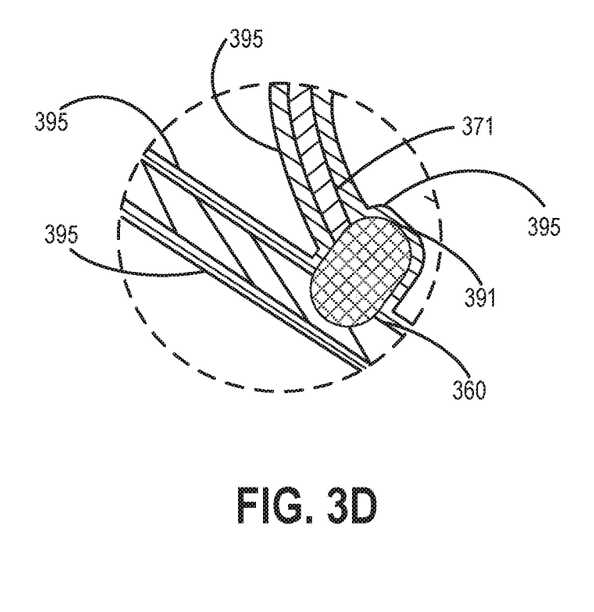
FIG. 3D shows a partial cross-sectional view of a welding joint coupling fuel filler pipe and the second device of FIG. 3A.
Figure 3E:
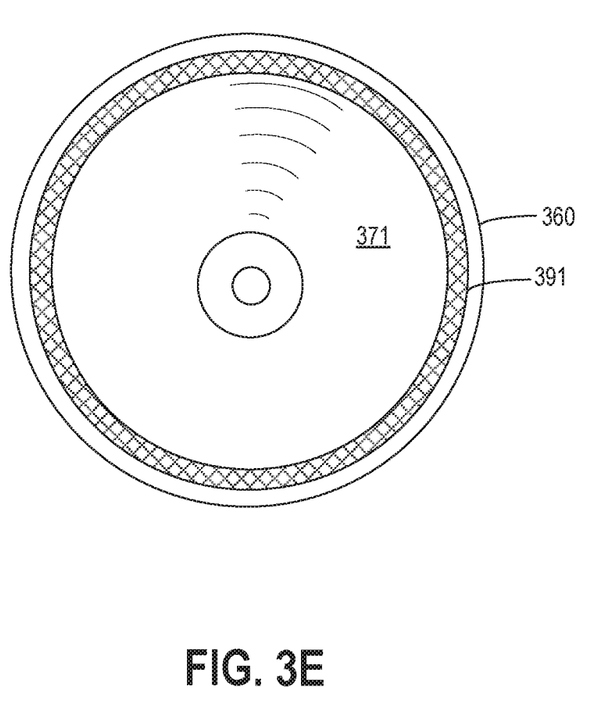
FIG. 3E is a bottom view of the fuel filler pipe showing the welding joint between the fuel filler pipe and the second device of FIG. 3A.

FIG. 3D shows a partial cross-sectional view of the welding joint 391 coupling the fuel filler pipe 360 and the second device 371. As shown, electroless nickel coating 395 covers the welding joint 391. Further, electroless nickel coating also coats the inside and outside surfaces of the second device 371. While the present examples shown in FIGS. 3B and 3D illustrate coating 395 on the surfaces that form the slots and cone, in some examples, the coating 395 may coat any simple or complex structures of the assembly. The structures may include sharp edges, holes, ridges, tabs, deep recesses, protrusions, conical structures, cylindrical structures, spindle shaped structures, slots, seams, external threads, internal threads, etc.

An example fuel filler pipe including multiple different structures is shown at FIGS. 4A-4C. Specifically, FIG. 4A shows a fuel filler pipe and device assembly 450. Assembly 450 includes a fuel filler pipe 460 comprising a plurality of holes 424 and slots 422. While the present example illustrates holes and slots, it will be appreciated that the fuel filler pipe 460 may include, additionally or alternatively, other geometric and/or non-geometric shapes. Examples include but not limited to sieve-like structures, flap or flap-like structures, spindle shaped structures, oval shaped openings, cylindrical structures, sharp edges, ridges, tabs, deep recesses, protrusions, conical structures, threads, seams, helical structures, etc. Further, the fuel filler pipe 460 may include external or internal threads for receiving a fuel filler cap.

Fuel filler pipe 460 further includes an anti-siphon device 471. Anti-siphon device 471 may be cone-shaped as shown. Other shapes, such as dome or a truncated cone, or any other geometrical and non-geometrical shape is also within the scope of the present disclosure. The anti-siphon device 471 may or may not contain openings such as slots, holes etc.

FIG. 4B shows surfaces of the fuel filler pipe 460 that form holes and slots coated with electroless nickel coating. FIG. 4B also shows anti-siphon device 471 and a welding joint 491 between the filler pipe 460 and the anti-siphon device 471 with electroless nickel coating. The welding joint 491 between the fuel filler pipe and the anti-siphon device is also illustrated in a bottom perspective view of the fuel filler pipe and the anti-siphon device assembly at FIG. 4C.

Further, as shown at FIG. 4B, the fuel filler pipe and the anti-siphon device are coated on the inside and the outside with electroless nickel. Further, the electroless nickel coating provides coating of substantially constant thickness on the different shapes and structures of the fuel filler pipe and the anti-siphon device. Further, the electroless nickel coating does not cause embrittlement the welding joints that couple the fuel filler pipe and the anti-siphon device.

Turning now to FIG. 3C, a partial cross-sectional view of the welding joints 390 coupling the fuel filler pipe 360 and the fuel tank 320 is shown. The assembly 350 after coating with electroless nickel is welded to the fuel tank 320. Thus, the welding joint 390 is over the coating. That is, the welding joint 390 is not coated by electroless nickel.

Further, in some examples, after welding the coated assembly to the fuel tank, a second coating, such as a powder coating, may be applied to the external surfaces of the fuel tank and the assembly including the second welding joints. Thus, the first welding joints are coated with electroless nickel but not coated with powder coating; while the second welding joints are not coated with electroless nickel but coated with powder coating.

In fuel systems using fuels such as ethanol containing gasoline, the ethanol corrodes the metals of the fuel filler pipe and the anti-siphon devices over time. Further, some fuel systems may use bio-diesel, which contains acids, which also increases corrosion of the metals of the fuel filler pipe and the anti-siphon devices. By utilizing electroless nickel coating corrosion may be reduced. Further, the electroless nickel coating provides uniform coating of the assembly including the welding. That is, electroless nickel coating provides uniform coating of substantially constant thickness on the inside and the outside surfaces of the fuel filler pipe and the anti-siphon device including external threads, internal threads, external tabs, inner surface of the fuel filler pipe that surrounds the anti-siphon device and surfaces that form shapes such as circular holes, oval apertures, shard edges, curved edges, curved surfaces, conical surfaces, etc. Thus, electroless nickel coating provides uniform corrosion protection to all the coated surfaces.

Further, when a user opens the fuel filler cap (prior to a refueling operation, for example), the fuel filler pipe and anti-siphon device assembly is visible to the user. In some examples, one or more first welding joints between the fuel filler pipe and the anti-siphon device may be visible. Thus, in addition to corrosion protection, the uniform coating deposited by the electroless nickel coating process improves visual appearance the assembly including the welding joints.

Taken together, electroless coating provides uniform coating of substantially constant thickness on inside and outside surfaces of the fuel filler pipe and anti-siphon device assembly. The coating provides increased resistance to corrosion due to alcohol and acids in the fuel. Further, the coating reduces galvanic corrosion between the metals of the fuel filler pipe and the cap threaded to the upper portion of the fuel filler pipe. Further, the electroless coating also provides uniform coating of the welding joint, thereby providing increased corrosion resistance without causing embrittlement of the weld. Still further, the electroless coating provides uniform coating of substantially constant thickness on the inside and the outside of complex structures and shapes. As a result, electroless coating provides uniform corrosion protection and improves visual appearance of the fuel filler pipe and anti-siphon device assembly.

Further, the electroless nickel coating provides weldability of the coated assembly to the fuel tank. That is, the coating is compatible with welding of the assembly to the tank and does not reduce the weldability of the coated assembly to the tank.

Figure 5:
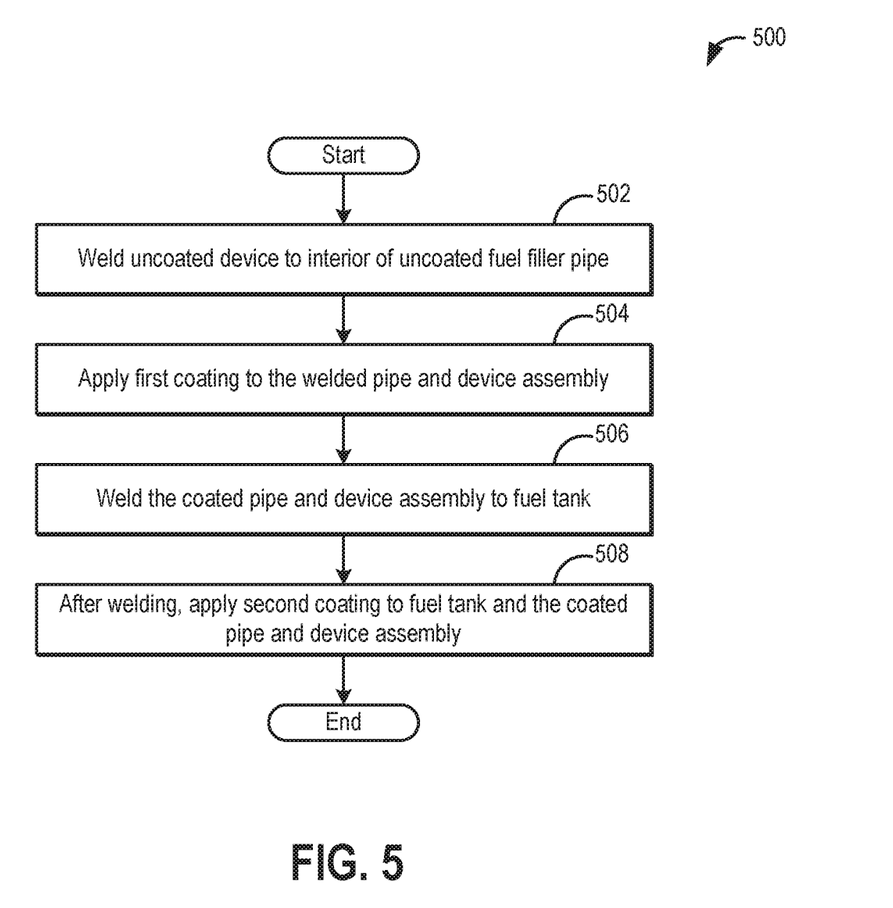
FIG. 5 is a flow chart illustrating an example manufacturing method for a fuel system including a fuel filler pipe, a device within the filler pipe, and a fuel tank.

Turning to FIG. 5, a flow chart illustrating an example method 500 for a fuel tank, such as fuel tank 20 at FIG. 1, which may be utilized in a vehicle system, such as vehicle system 6 at FIG. 1 is shown. Specifically, method 500 may be a manufacturing method for coupling one or more devices, such as insert 70 at FIG. 1 and/or insert 71 at FIG. 1, to a fuel filler pipe, such as fuel filler pipe 60 at FIG. 1, and then coupling the fuel filler pipe and device assembly to the fuel tank. The method 500 may be performed in a manufacturing plant, for example. In one example, the method may be performed manually. In other examples, the method may be partially or fully automated.

Method 500 begins at 502. At 502, method 500 includes coupling an uncoated device (that is, device without electroless metal coating) to an uncoated fuel filler pipe (that is, pipe without electroless nickel coating). For example, the uncoated device may be positioned within the uncoated fuel filler pipe, and the uncoated device may be coupled to the interior of the fuel filler pipe by one or more first welding joints. The first welding joint may be a welding joint such as welding joint 280 in FIGS. 2A and 2B coupling a first device, such as first device 270 with fuel filler pipe 260 at FIGS. 2A and 2B. Alternatively, the first welding joint may be a welding joint such as welding joint 291 at FIG. 2A coupling a second device, such as second device 271 with fuel filler pipe 260.

In some examples, more than one uncoated device may be coupled to the fuel filler pipe. For example, a first uncoated device and a second uncoated device may be coupled to the fuel filler pipe. As mentioned above, the first uncoated device may be a nozzle guide for receiving a nozzle of a fuel dispenser, such as first device 70 at FIG. 1, first device 270 at FIG. 2A, or first device 370 at FIG. 3A. The second uncoated device may be an anti-siphon device, such as the second device 71 at FIG. 1, device 271 at FIG. 2A, the second device 371 at FIG. 3A, or the anti-siphon device 471 at FIG. 4A, or any anti-siphon device used for preventing siphoning of the fuel from the fuel tank via the fuel filler pipe. In some examples, the device may provide additional functions, such as a fuel anti-splashing function, in addition to anti-siphoning function.

In the following discussion of method 500, the welded fuel filler pipe and device will be referred to as the pipe and device assembly.

Further, the fuel filler pipe and the device may be made of different types of metals that are welding compatible or the same type of metal. In one example, the fuel filler pipe and the device may be made of aluminized steel. In another example, the fuel filler pipe and the device may be made of aluminum. Next, upon welding the uncoated devices to the interior of the fuel filler pipe, method 500 proceeds to 504. At 504, method 500 includes applying a first coating to the welded pipe and device assembly. The first coating may be a nickel coating applied by an electroless nickel plating process. The electroless nickel plating process utilizes an autocatalytic chemical reaction to deposit a coating of substantially constant thickness on a substrate, which is the pipe and device assembly. As known to those skilled in the art, the electroless plating process is performed by utilizing an electroless nickel bath including a source of nickel ions, a reducing agent, one or more suitable complexing agents, one or more suitable stabilizers and/or inhibitors and energy. During the electroless nickel plating process, an alloy of Nickel (e.g., nickel phosphorous) is deposited on the substrate. The coating is applied on internal and external surfaces of the pipe and device assembly including surfaces that form complex shapes and structures. The complex shapes and structures may include but not limited to sharp edges, holes, ridges, tabs, deep recesses, protrusions, conical structures, cylindrical structures, spindle shaped structures, slots, seams, threads (internal and external), etc. Further, since the coating is applied after the first welding joints between device and the fuel filler pipe are formed, the first welding joints are also coated with electroless nickel. That is, the coating is over the first welding joints. When more than one device is attached to the filler pipe, each welding joint that couples each of the devices to the fuel filler pipe are coated with electroless nickel. As mentioned earlier, the electroless nickel coating does not cause embrittlement of the weld and provides rust protection to the first welding joint. Example cross-sections of coated welding joints are illustrated with respect to FIGS. 2B and 3B, 3D and 4B.

Further, the electroless plating process provides uniform deposition of metal. That is, the first coating is of substantially constant thickness. In one example, the thickness may be 25 micrometers. In another example, the thickness may be between 13 and 15 micrometers. However, it must be noted that any thickness of the electroless nickel coating is also within the scope of this disclosure.

Next, upon applying the first coating to the pipe and device assembly, method 500 proceeds to 506. At 506, method 500 includes coupling the coated pipe and device assembly to the fuel tank via one or more second welding joints. The second welding joints may be formed by externally welding the fuel filler pipe of the coated pipe and device assembly to the fuel tank. In one example, the fuel tank may be coated with electroless nickel prior to welding with the fuel filler pipe. In some other examples, the fuel tank may not be coated. As the coated assembly is welded to the fuel tank, the second welding joint is over the electroless nickel coating and is not coated with the electroless nickel coating. Example cross-sections of uncoated second welding joints are illustrated with respect to FIGS. 2C, and 3C.

After welding the coated pipe and device assembly to the fuel tank, method 500 proceeds to 508. At 508, method 500 includes applying a second coating to the fuel tank coupled with the pipe and device assembly. The second coating is not an electroless nickel coating. Rather, the second coating may a powder coating, for example. Alternatively, the second coating may be any type of paint, E-coat, wax coating, etc. The second coating is applied to external surfaces of the fuel tank and the pipe and device assembly including the second welding joint and excluding the threads on the fuel filler pipe. Thus, while the first welding joints are coated with electroless nickel and not coated with powder coating, the second welding joints are not coated with electroless nickel but coated with powder coating. In some examples, the powder coating may be optional. Thus, the external surfaces of the fuel filler pipe, the fuel tank, and the second welding joints may not be coated with powder coating.

In this way, a fuel filler pipe and device assembly may be coupled to a fuel tank. By applying a metal coating after welding the device to the fuel filler pipe, the first welding joints coupling the fuel filler pipe and the device is coated. The coating reduces corrosion due to alcohol and acids in the fuels, corrosion due to external environmental conditions (salt, humidity, etc.) and reduces galvanic corrosion between the filler pipe and a cap threaded to the filler pipe.

As a result, the coating reduces rust formation, which reduces mechanical degradation and improves visual appearance. Further, by utilizing an electroless plating process, nickel coating may be applied to surfaces that form plurality of various complex geometrical and non-geometrical structures, and a thickness of the coating is substantially constant on all coated surfaces, thereby providing uniform corrosion protection.

In one example, a manufacturing method for a fuel tank and a fuel filler pipe includes coupling a device to the fuel filler pipe with one or more first welding joints, then coating the coupled fuel filler pipe and device with a first coating; and then, coupling the coated fuel filler pipe including the device to the fuel tank with one or more second welding joints. In a first example of the method, the first coating is applied on an outside and inside of the fuel filler pipe, including the device and the first welding joints. A second example of the method optionally includes the first example and further includes wherein the device is at least partially positioned within the fuel filler pipe, and the one or more first welding joints are formed by internally welding the device to portions along an internal perimeter of the fuel filler pipe. A third example of the method optionally includes one or more of the first and second examples, and further includes wherein the fuel filler pipe is at least partially positioned within the fuel tank, and the one or more second welding joints are formed by externally welding the coated fuel filler pipe with the fuel tank. A fourth example of the method optionally includes one or more of the first through third examples, and further includes, wherein the device is an anti-siphoning device. A fifth example of the method optionally includes one or more of the first through fourth examples, and further includes, wherein the first coating is a nickel coating. A sixth example of the method optionally includes one or more of the first through fifth examples, and further includes, wherein the nickel coating is applied by an electroless nickel coating process. A seventh example of the method optionally includes one or more of the first through sixth examples, and further includes, after coupling the coated fuel filler pipe including the device to the fuel tank, applying a second coating on external surfaces of the fuel tank and the coated fuel filler pipe. An eighth example of the method optionally includes one or more of the first through seventh examples, and further includes, wherein the second coating is a powder coating.

In another example, a manufacturing method for a fuel tank and a fuel filler pipe includes welding an anti-siphon device to an interior of the fuel filler pipe, then coating the welded fuel filler pipe and the device with an electroless nickel coating; and then welding the coated fuel filler pipe and the device to the fuel tank. In a first example of the method, the electroless nickel coating is applied on an outside and inside of the fuel filler tube including the anti-siphon device and the welds coupling the anti-siphon device and the fuel filler pipe. A second example of the method optionally includes the first example and further includes wherein the electroless nickel coating is applied to all surfaces of the anti-siphon device, including surfaces that form geometrical and non-geometrical structures including a plurality of holes, slots, oval-apertures, cones, cylinders, spindle-shaped structures, protrusions, recesses, ridges, crevices, threads, seams, and tabs. A third example of the method optionally includes one or more of the first and second examples, and further includes wherein the electroless nickel coating is applied for a desired duration to obtain a desired coating thickness. A fourth example of the method optionally includes one or more of the first through third examples, and further includes, after welding the coated fuel filler pipe and the device to the fuel tank, applying a powder coating to fuel tank and the electroless nickel coated fuel filler pipe. A fifth example of the method optionally includes one or more of the first through fourth examples, and further includes, wherein the powder coating is applied on an outside of the fuel tank and the electroless nickel coated fuel filler pipe including the welds coupling the fuel tank and the fuel filler pipe.

In another example, a fuel system of a vehicle includes a filler tube with external threads, the filler tube welded to a fuel tank; and an anti-siphon structure at least partially positioned within the filler tube and welded to the filler tube; wherein a first coating is applied on external surfaces and internal surfaces of the filler tube including on the threads and the anti-siphon structure; wherein the welds coupling the filler tube and the fuel tank are not coated with the first coating; and wherein the welds coupling the anti-siphon structure and the filler tube are coated with the first coating. In a first example of the system, the anti-siphon structure is welded to the filler tube at a plurality of portions along an internal perimeter of the tube. A second example of the system optionally includes the first example and further includes wherein the first coating is applied over all surfaces of the anti-siphon device; and wherein the first coating is an electroless nickel coating. A third example of the system optionally includes one or more of the first and second examples, and further includes wherein the anti-siphon structure comprises surfaces that form geometrical and non-geometrical structures, including a plurality of holes, slots, oval-apertures, cones, cylinders, spindle-shaped structures, protrusions, recesses, ridges, crevices, threads, seams, and tabs. A fourth example of the system optionally includes one or more of the first through third examples, and further includes, wherein the filler tube comprises surfaces that form geometrical and non-geometrical structures, including a plurality of holes, slots, oval-apertures, cones, cylinders, spindle-shaped structures, protrusions, recesses, ridges, crevices, threads, seams, and tabs.

Note that the example routines/methods included herein can be used with various engine and/or vehicle system configurations. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A manufacturing method for a fuel tank and a fuel filler pipe, comprising:
   welding an outer surface of a device to an interior surface of the fuel filler pipe with one or more first welding joints to form an assembly such that the device is entirely within the fuel filler pipe, the device comprising one or more surfaces that converge as they extend into an interior of the fuel filler pipe, an array of holes that circumscribe a portion of the device within the fuel filler pipe, and an array of oblong slots that circumscribe the portion of the device within the fuel filler pipe;
   then, coating the assembly, including the arrays and welds, with a first electroless nickel coating;
   then, welding an exterior surface of the fuel filler pipe, including the first electroless nickel coating, to the fuel tank with one or more second welding joints, wherein the welding on the interior of the fuel filler pipe is electroless nickel coated but the welding on an exterior of the fuel filler pipe is not; and
   then, powder coating an exterior of the fuel tank and the exterior of the fuel filler pipe, including the welding between the fuel tank and the fuel filler pipe.

2. The manufacturing method of claim 1, wherein the first electroless nickel coating is applied on an outside and an inside of the fuel filler pipe, including the device and the one or more first welding joints, and wherein the one or more second welding joints are not coated with the first electroless nickel coating.

3. The manufacturing method of claim 1, wherein the first welding joints are formed by welding the device to portions along an internal perimeter of the fuel filler pipe.

4. The manufacturing method of claim 1, wherein the fuel filler pipe is at least partially positioned within the fuel tank, and the one or more second welding joints are formed by welding an external surface of the coated fuel filler pipe with the fuel tank.

5. A manufacturing method for a fuel tank and a fuel filler pipe, comprising:
   welding a base end of a conical anti-siphon device to an interior of the fuel filler pipe to form a fuel filler assembly, the anti-siphon device comprising a tapered end extending into the interior of the fuel filler assembly and a plurality of rows of rounded or elongate apertures encircling the anti-siphon device within the fuel filler assembly;
   then, coating the fuel filler assembly, including the welding, with an electroless nickel coating;
   then, welding an external surface of the fuel filler assembly, including the electroless nickel coating, to the fuel tank; and
   then, applying a second coating to the fuel filler assembly and the fuel tank, including the welding between the fuel filler assembly and the fuel tank,
   wherein the electroless nickel coating is not applied to the welds on the external surface of the fuel filler assembly.

6. The manufacturing method of claim 5, wherein the electroless nickel coating is applied on an outside and an inside of the fuel filler pipe, including the anti-siphon device, and one or more first welding joints coupling the base end of the anti-siphon device with the interior of the fuel filler pipe.

7. The manufacturing method of claim 6, wherein the electroless nickel coating is applied to all surfaces of the anti-siphon device, and the anti-siphon device includes at least two of a plurality of holes, slots, oval-apertures, cones, cylinders, spindle-shaped structures, protrusions, recesses, ridges, crevices, threads, seams, and tabs.

8. The manufacturing method of claim 5, wherein the electroless nickel coating is applied for a duration to obtain a uniform coating of substantially constant thickness.

9. The manufacturing method of claim 5, wherein the second coating is a powder coating.

10. The manufacturing method of claim 9, wherein the powder coating is applied on an outside of the fuel tank and the coated fuel filler pipe, including one or more second welding joints coupling the fuel tank and the fuel filler pipe.

11. The manufacturing method of claim 1, wherein the fuel tank is electroless nickel coated prior to welding the fuel filler assembly to the fuel tank.

12. The manufacturing method of claim 1, wherein the device is an anti-siphon device that includes at least a plurality of rows comprised of at least one of holes, slots, or oval-apertures, the rows encircling an exterior surface of the anti-siphon device concentric with the fuel filler pipe and at least two of cones, cylinders, spindle-shaped structures, protrusions, recesses, ridges, crevices, threads, seams, and tabs.

13. The manufacturing method of claim 5, wherein the plurality of rows of rounded or elongate apertures is positioned on an exterior surface of the anti-siphon device concentric with a longitudinal axis of the fuel filler pipe, and wherein the plurality of rows of rounded or elongate apertures is arranged in an array extending along a central axis of the fuel filler pipe, and further comprising at least two of cones, cylinders, spindle-shaped structures, protrusions, recesses, ridges, crevices, threads, seams, and tabs.

* * * * *